United States Patent Office 3,623,409
Patented Nov. 30, 1971

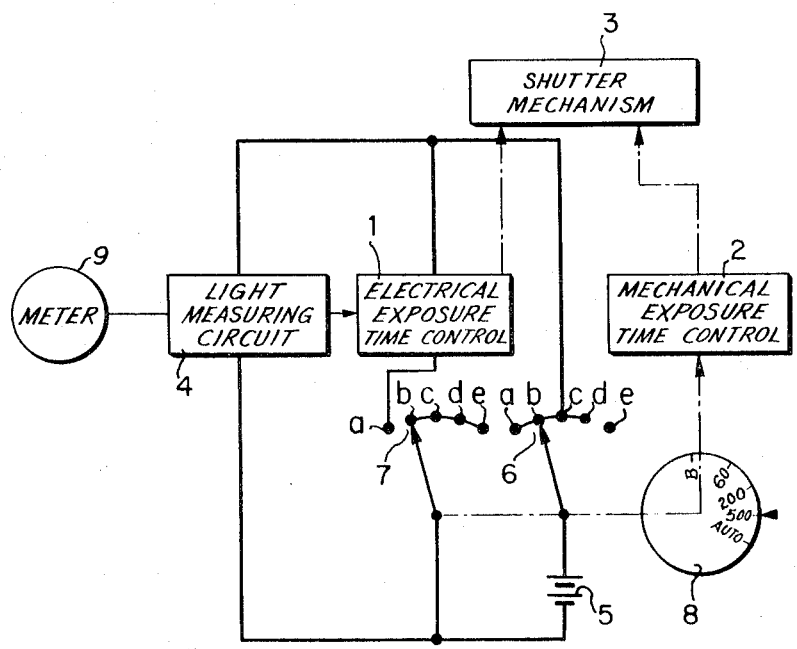

3,623,409
ELECTRICAL OR MECHANICAL CAMERA SHUTTER
Naoyuki Uno, Iruma-gun, Saitama-ken, and Koichiro Watanabe, Tokyo-to, Japan, assignors to Asahi Kogaku Kogyo Kabushiki Kaisha, Tokyo-to, Japan
Filed May 19, 1969, Ser. No. 825,682
Claims priority, application Japan, July 26, 1968, 43/52,487
Int. Cl. G03b 7/08, 9/58; G01j 1/44
U.S. Cl. 95—10 C
2 Claims

ABSTRACT OF THE DISCLOSURE

A camera shutter includes an electrical and a mechanical timer. A light measuring network provided with a visual indecator functtons as a light controlled timing network which triggers a solid state switch controlling the electrical timer. A pair of ganged switches selectively connect a battery to the measuring network alone, to the measuring and switch network, or deenergize both networks and is connected to the mechanical shutter speed control knob to energize both networks when the knob is at a position which either disables the mechanical timer or sets it at an exposure less than the minimum electrically actuated exposure time.

BACKGROUND OF THE INVENTION

The present invention relates generally to improvements in photographic cameras and it relates particularly to an improved camera shutter timing mechanism in which the shutter exposure time is alternatively preset or is automatically responsive to the camera incident light.

Many types of automatic shutter controls for cameras have been employed and proposed and are commonly typified by the use of an RC timing network in which the resistor section is a photoconductor exposed to the camera incident light and the voltage across the capacitor is applied to the input of a solid state switch whose output controls the current to a solenoid which in turn controls the release of the shutter to its closed position. Thus, the intensity of the incident light controls the charging time of the capacitor to trigger voltage and hence the exposure time. It is known in shutters of the above type to substitute a selected resisor of predetermined value for the photoconductor whereby to obtain a corresponding exposure time for the shutter independent of the incident light. The exposure time may be varied by varying the value of the resistor or capacitor or both in the RC timing network. The aforesaid expedient for adjusting the exposure time of an electrically controlled shuter of the above type, however, possesses numerous drawbacks and disadvantages. The electromagnet or solenoid employed to maintain the shutter closure release element in the shutter holding condition consumes a large amount of current which increases sharply with an increase in exposure time. Moreover, the incorporation of a manual exposure time control section in the automatic exposure time shutter mechanism results in a complicated and frequently unreliable mechanism which leaves much to be desired.

SUMMARY OF THE INVENTION

It is a principal object of the present invention to provide an improved camera shutter system.

Another object of the present invention is to provide an improved exposure timing mechanism for camera shutters.

Still another object of the present invention is to provide an improved camera shutter automatic light responsive timing mechanism including means for manually presetting the shutter exposure time.

A further object of the present invention is to provide an improved camera shutter mechanism of the above nature characterized by its low current consumption, reliability simplicity, versitility and adaptability.

The above and other objects of the present invention will become apparent from a reading of the following description taken in conjunction with the accompanying drawing which illustrates a preferred embodiment thereof.

In a sense the present invention contemplates the provision in a camera shutter mechanism including an electrically actuated and mechanically actuated shutter closure initiating means, of an adjustable mechanical timer, first control means for actuating said shutter closure initiating means, light measuring means responsive to incident light, second control means responsive to said light measuring means for actuating said shutter closure initiating means, and means for selectively actuating said first and second control means. According to a preferred form of the improved shutter mechanism the light measuring means includes means for providing a visual indication of the light value measurement. The light measuring means includes means providing a visual indication of the light value measurement. The light measuring means and the second control means are energized by a battery to which they are connected through ganged switches mechanically coupled to the mechanical timer adjusting member so as to be concurrently operable therewith. The switches and adjusting member are so related that both the light measuring means and the second control means are energized only when the mechanical timer control is disabled relative to the shutter such as by being set at an exposure time less than the minimum automatic timer exposure time, the second control means is deenergized and the light measuring means is energized when the time adjusting member is set to a selected exposure time, and the battery circuit is opened when the adjusting member is set to bulb exposure or other predetermined setting.

By incorporating a mechanical exposure time control section adapted to be manually adjustable into an electrical shutter having an automtic exposure time control section the advantages of both the electrical and the mechanical control sections are achieved in a shutter system for a photographic camera and the exposure time is automatically as well as manually adjustable. Such a photographic camera is highly convenient for use since selective use of said both control sections can be accomplished by a simple manipulation. The mechanical exposure time control section is adapted to be manually adjustable and the electrical exposure time control section is adapted to be automatically regulated. The operating member is provided for switching said both control sections and controlling manual or automatic control action, said operating member being associated with the switching operation so that only the light measuring or photometric section is operative when said operating member is in its range for manual control while said photometric section and automatic exposure time control section are operative when said operating member is in its automatic control position.

BRIEF DESCRIPTION OF THE DRAWING

The drawing is a block diagram of a camera shutter system embodying the present invention.

DESCRIPTION OF THE PREFERRED EMBODIMENT

Referring now to the drawing which illustrates a preferred embodiment of the present invention, the reference numeral 1 generally designates an electrical exposure time control section which automatically adjusts the exposure time depending on the brightness of an object so as to control the action of a shutter mechanism 3 which includes both electrically and mechanically actuated shutter closure initiating means. A mechanical exposure time control section 2 controls shutter mechanism 3 with a particular exposure time which is manually adjusted or set. In controlling shutter mechanism 3, the electrical exposure time control section 1 maintains a starting member for shutter closing of the shutter mechanism 3 at a position where closing action is effectively blocked due to the excitation and attraction of an electromagnet or solenoid which is energized before the shutter opening, and effectuates starting action for shutter closing of said shutter mechanism 3 by the cutting off and deenergization of said electromagnet after a predetermined time from said shutter opening, while the mechanical exposure time control section 2 directly controls a driving shaft for shutter closing of said shutter mechanism 3 with a mechanical governor mechanism, said driving shaft for shutter closing being prevented by said starting member for shutter closing from acting. A photometric or light measuring circuit section 4 serves as a means for detecting the brightness of an object and is connected to electrical exposure time control section 1 and visually indicates by means of any conventional indicator 9 a photometric value such as through the camera view finder. Section 1 represents control means responsive to the light measuring means for actuating the shutter closure initiating means and section 2 represents mechanical means for actuating the shutter closure initiating means. The reference numeral 5 designates a source battery for electrical exposure time control section 1 and photometric circuit section 4, both of which separately include energizing circuits, respectively. Each of these energizing circuits includes therein a source switch 6 and an automatic control circuit switch 7 which are ganged or associated with each other so that change-over may be effected successively among change-over contacts a, b, c, d and e. A manually operable shutter dial 8 is coupled to switches 6 and 7 and timer 2 to regulate the time adjusting action of mechanical exposure time control section 2 and to accomplish change-over of switches 6 and 7. Shutter dial 8 and switches 6 and 7 are associated in an arrangement such that, as for change-over contacts of source switch 6, the source circuit is closed over change-over range of said change-over to contacts a, b, c and d which are interconnected and opened upon change-over to the contact e, while, as for said automatic control circuit switch 7, the circuit is closed upon change-over to the contact a and opened upon change-over to the other contacts b, c, d and e. The shutter dial 8 is provided thereon successively with AUTO indicating the automatic control 500 . . . 60, values of exposure time (seconds), and B indicating the bulb control which are corresponding to ranges of change-over operation for said change-over contacts a, b, c, d and e.

It should be noted that the light measuring network 4 and shutter closure control network 1 are, per se, of known construction. They may include an RC timing network in which R is a photoconductor exposed to the camera incident light and a solid state switch the input to which is connected to the RC capacitor and the output of which controls the energization of the shutter closure release solenoid. In operation, upon opening of the shutter the solid state switch is closed to energize the solenoid to keep the shutter open, and upon the capacitor being charged to the switch triggering voltage in a time which is a function of the light incident on the photoconductor, the solid state switch network is opened, the solenoid deenergized and the shutter closure initiated. A meter is provided in the known manner which responds to the photoconductor resistance to provide a visual indication of the incident light. The mechanical timer 2 is likewise of conventional construction.

Considering now the operation of the improved device above described, and assuming that the shutter dial 8 is set to AUTO, the automatic control indication, the associated source switch 6 and automatic control circuit switch 7 are both at the change-over contact a and the circuit is closed, so that both the photometric circuit 4 and the electrical exposure time control section 1 are operative. In such a case, the action of the mechanical exposure time control section 2 upon the shutter mechanism 3 is disabled or eliminated such as by interlocking mechanical exposure time control section 2 with dial 8 or the mechanical exposure time control section 2 may be set so as to regulate the shutter mechanism 3 to an exposure lower than a predetermined minimum exposure time set by electrical exposure time control section 1 to effectuate automatic exposure time control operation of electrical exposure time control section 1 without any interference, depending upon the brightness of an object sensed by photometric circuit section 4.

As the shutter dial 8 is set successively to indications 500 . . . 60, switches 6 and 7 are also successively changed over to contacts b, c and d. The source switch 6 is closed while the automatic control circuit switch 7 is opened, so that only the photometric circuit section 4 is operative while the electric exposure time control section 1 is non-operative and its statring member for shutter closing using the electromagnet is out of the range within which starting for shutter closing is blocked. Consequently, action of the mechanical exposure time control section 2 depending on exposure time (seconds) values which are set by successive operation of dial 8 effectively controls the shutter mechanism 3. In such a case, the photometric circuit section 4 is operative so that setting operation by said dial 8 is possible by observing the photometric values indicated within means such as a view finder by photometric circuit section 4. The present arrangement in one state thus provides the performance of a mechanical shutter camera of conventional type having an exposure meter incorporated therein.

According to the present invention, as clear from the above description any loss of electric power in the electrical exposure time control section 1 is eliminated so far as over setting range within which the exposure time may be controlled by manually setting operation of the shutter dial 8. The device constructed in accordance with the present invention, therefore, is superior to the shutter operating devices of conventional type such as an electrical shutter wherein exposure time control with a manual adjustment also is effected by an electrically operating section which is thus always operative in that the consumption of a source battery may be reduced and therefore the life for use thereof may be greatly prolonged.

When shutter dial 8 is set on B, the bulb control indication, the source switch 6 is opened so that both the photometric circuit section 4 and the electrical exposure time control section 1 are disconnceted from the source battery 5. The shutter mechanism 3 is, under such a condition, subject to the bulb exposure control by the mechanical exposure time control section 2, without any consumption of source battery 5.

The present invention provides, as described hereinbefore, a shutter operating device for a photographic camera having a mechanical exposure time control section adapted to be manually adjustable and an electrical exposure time control section adapted to be automatically adjustable, wherein operating members such as a shutter dial are interlocked with the device so that only an inner photometric section of an electrically operating section may be operative when said operating members are in their range for manual control operation while said photometric section and said automatic exposure time control section may be operative when said operating members are in their range for automatic control operation. Opening and closing an energizing circuit to said electrically operating section is controlled in a manner as mentioned above and thus advantages of both the manually and the automatically adjusting operations can be most effectively utilized. Specifically, the device provided according to this invention is extremely useful for practical application in view of selectivity of exposure time, longer life for use of a source battery, and extremely simple and reliable operation for selecting said manually and automatically adjusting operations.

Furthermore, in the device according to the present invention, it is possible to select optionally the range of manually controlled exposure time to be adjusted by the shutter dial 8 if the number of change-over contacts of said switches 6 and 7 is increased or decreased depending on exposure time (seconds) indications on said dial 8.

While there has been described and illustrated a preferred embodiment of the present invention, it is apparent that numerous alterations, omissions and additions may be made without departing from the spirit thereof.

We claim:

1. In combination with a camera shutter mechanism including an electrically actuated and mechanically actuated shutter closure initiating means, an adjustable mechanical timer first control means, including a timer speed control knob, for actuating said shutter closure initiating means, means for measuring the camera incident light and providing a visual indication of the value thereof, second control means responsive to said light measuring means for actuating said shutter closure initiating means, and means for selectively actuating said light measuring and first and second control means in response to said control knob.

2. The combination of claim 1 including a battery for energizing said light measuring and control means, said selector means including a first switch movable between an open and closed position for connecting said battery to said second control means and a second switch movable between opened and closed positions and concurrently operable with said first switch and connected between said battery and said light measuring means for selectively energizing said light measuring means with the energization and deenergization of said second control means or deenergizing said light measuring means and said second control means.

References Cited
UNITED STATES PATENTS

| | | | |
|---|---|---|---|
| 3,303,766 | 2/1967 | Karirawa et al. | 95—10 C |
| 3,460,450 | 8/1969 | Ogihara | 95—10 C |
| 3,504,611 | 4/1970 | Richter et al. | 95—53 X |

JOSEPH F. PETERS, Jr., Primary Examiner

U.S. Cl. X.R.

95—53 E